United States Patent [19]

Garner et al.

[11] 4,274,808
[45] Jun. 23, 1981

[54] SWASHPLATE DRIVE REDUNDANCY SYSTEM

[75] Inventors: Jimmy G. Garner, Hurst; Kenneth F. Guinn, Fort Worth, both of Tex.

[73] Assignee: Textron, Inc., Providence, R.I.

[21] Appl. No.: 971,712

[22] Filed: Dec. 21, 1978

[51] Int. Cl.³ .............................................. B64C 27/74
[52] U.S. Cl. ..................................... 416/114; 416/1; 416/47; 416/162
[58] Field of Search ................. 416/114, 115, 162, 47; 244/17.13, 17.25, 17.27, 83 J

[56] References Cited

U.S. PATENT DOCUMENTS

| | | | |
|---|---|---|---|
| 2,919,081 | 12/1959 | Schön | 244/17.13 |
| 2,978,038 | 4/1961 | Doman et al. | 416/114 |
| 3,256,780 | 6/1966 | Riley et al. | 416/114 X |
| 3,570,786 | 3/1971 | Lewis | 416/115 X |
| 3,625,632 | 12/1971 | Casterline | 416/114 X |
| 3,767,323 | 10/1973 | Zech | 416/114 X |
| 3,790,108 | 2/1974 | Bock | 74/469 X |

FOREIGN PATENT DOCUMENTS 995459  12/1951  France ....................... 416/115

OTHER PUBLICATIONS

Flight International (6/3/78), pp. 1696-1697.

Primary Examiner—Everette A. Powell, Jr.
Attorney, Agent, or Firm—Richards, Harris & Medlock

[57] ABSTRACT

A helicopter having a mast 50 which drives a rotor and which is driven from a transmission 16 has a swashplate 10 individually linked to pitch horns on each rotor blade. At least four control channels 11-15 are coupled to the swashplate. Three channels may control the attitude and position of the swashplate. The control channels 11-15 are actuated in response to pilot commands transmitted by means including mechanical, optical or electrical systems. A separate power unit 21-25, 31-35 supplies each control channel. Each power unit is directly driven by the transmission 16. Means 11c-15c applies control of the swashplate 10 from among the control channels 11-15.

10 Claims, 10 Drawing Figures

SWASHPLATE DRIVE REDUNDANCY SYSTEM

TECHNICAL FIELD

This invention relates to controls in a helicopter, and more particularly to redundant drive means and control means for a swashplate.

BACKGROUND ART

Helicopters generally have utilized mechanical linkages leading from a pilot control stick to actuator inputs for controlling the location and attitude of a swashplate. The swashplate is then coupled to pitch horns on rotor blades to control cyclic pitch and collective pitch. Variations in cyclic pitch are produced by tilting the swashplate. Variations in collective pitch are produced by raising and lowering the swashplate. The position and attitude of a swashplate may be controlled by three actuators connected to three points on the swashplate. Electrical sensors have been utilized to sense pilot inputs for producing control signals in a servo system which in turn drives swashplate actuators.

Military aircraft are vulnerable to damage by enemy fire. Because of such exposure, military specifications for a control system require continued operability, even though a given control channel fails, is damaged or otherwise is placed out of action.

Any three actuators may determine the plane and position of the swashplate. More than three actuators may provide for operating redundancy. In such case, the failure of mechanical hardware as upon ballistic impact can be tolerated to a degree depending upon the extent of redundancy.

DISCLOSURE OF THE INVENTION

In accordance with the present invention, four or more hydraulic actuator units are coupled to the swashplate. Each actuator is provided with hydraulic power and electrical power separate and apart from the sources for any other actuator. This assures redundancy which, except for failure logic, is independent one channel from the other. Each channel is isolated from every other channel and while all of the actuator units may share the control loads of the swashplate, the actuators are sized so that any set, down to three, can react and accommodate the control loads required at the swashplate.

More particularly, in accordance with the present invention a helicopter control system is provided where rotor blades are controlled by linkages to a swashplate which is elevated or tilted to change collective or cyclic pitch, respectively, by inputs to four or more spaced points on the swashplate. A hydraulic actuator is linked between each control point and the transmission. An electrical generator is adapted to be mounted on and to be driven directly by the transmission during rotation of the rotor. A hydraulic pump is mounted to be driven by the transmission during rotation of the rotor. Hydraulic channels leading from each pump to its actuator and electrical channels leading from each generator to its actuator provide power therefor. Pilot control inputs to the actuators cause the actuators to apply forces to the swashplate. Each actuator operates under the power of its own pump and alternator, each actuator having a separate alternator and a separate pump associated therewith.

BRIEF DESCRIPTION OF THE DRAWINGS

A more complete understanding of the invention and its advantages will be apparent from the following detailed description taken in conjunction with the accompanying drawings in which.

DETAILED DESCRIPTION

FIG. 1

Figure 1:
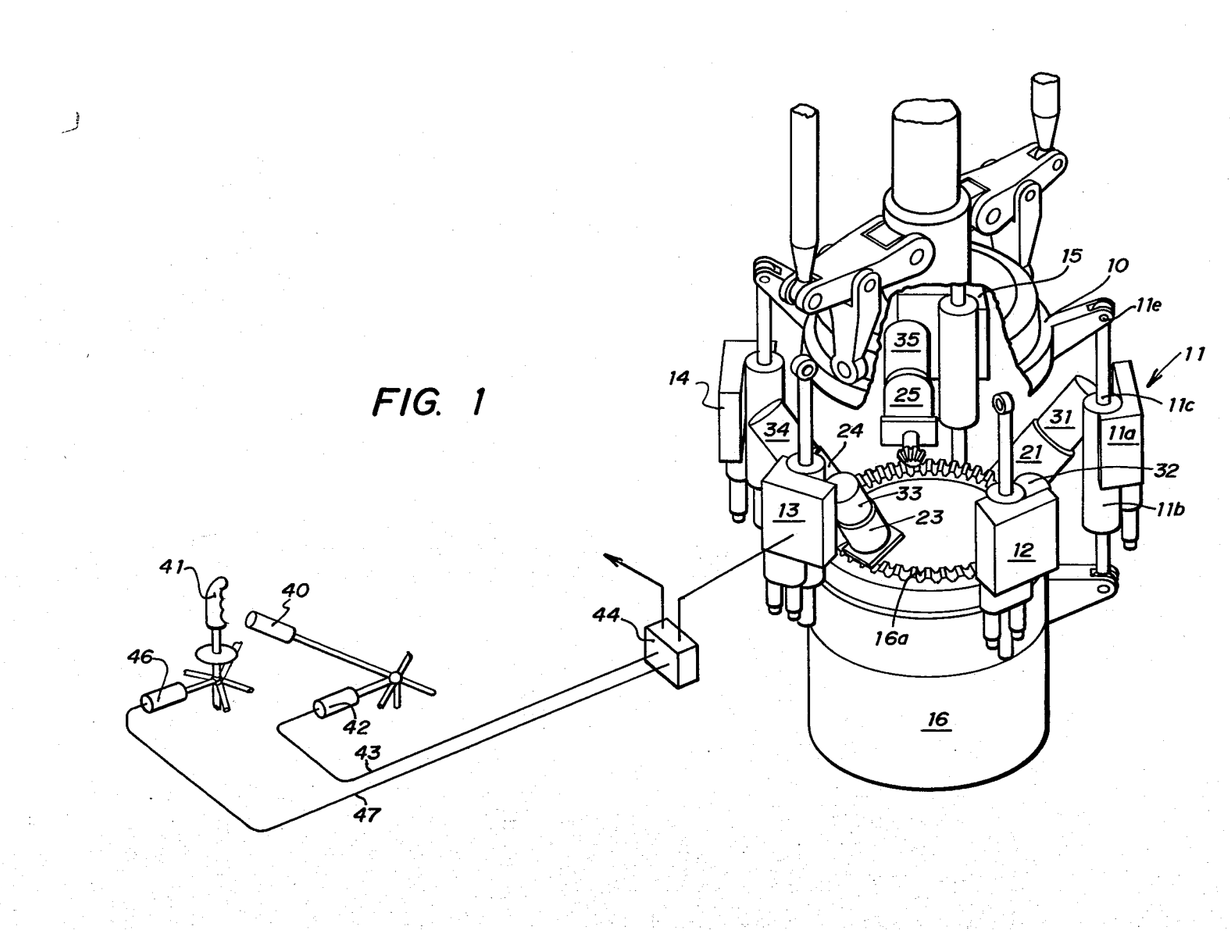
FIG. 1 illustrates one embodiment of the present invention.

FIG. 1 schematically illustrates an embodiment of the present invention wherein a swashplate 10 is controlled as to attitude and position by three or more of five electrohydraulic actuators 11-15. The actuators 11-15 are pivotally based on a main transmission 16. In the form shown the actuators 11-15 are arrayed at uniform spacing around the periphery of transmission 16. As will later be shown in more detail, actuator 11 includes a set of control valves mounted in housing 11a and a hydraulic actuating cylinder 11b. A piston rod 11c extends to a pivot point 11e on the swashplate 10. Each of the actuators 11-15 are so coupled between transmission 16 and swashplate 10.

Figure 2:
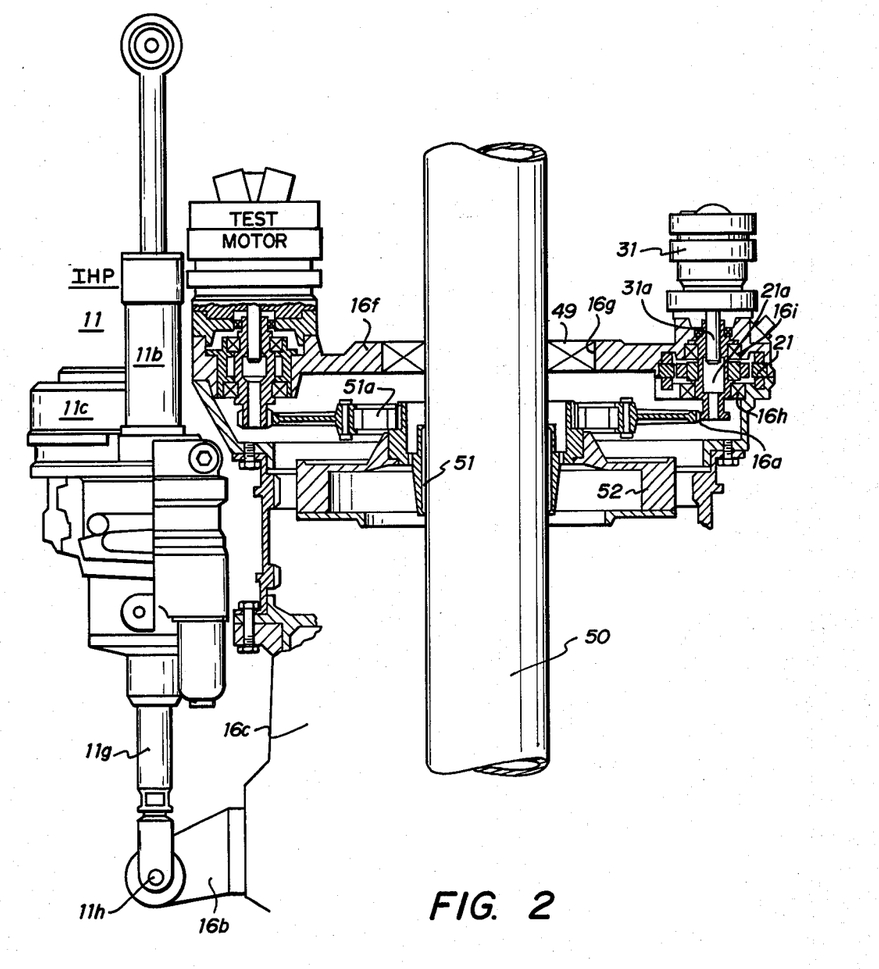
FIG. 2 is a sectional view through a transmission showing a power arrangement for an actuator.

The transmission 16 is provided with a driving gear 16a represented by a ring gear which rotates with and is coupled to the mast which is driven by the transmission. The mast and the mounting thereon for gear 16a are not shown in FIG. 1 but in preferred forms are shown in FIG. 2 as will be described.

In accordance with the present invention, each of the actuators 11-15 is provided with a separate electrical power source and a separate hydraulic power source. More particularly, actuator 11 is provided with an electrical generator 21 and a hydraulic pump 31. Similarly, actuator 12 is provided with an electrical generator (not shown) and a hydraulic pump 32. Actuator 13 is provided with an electrical generator 23 and a hydraulic pump 33. Actuator 14 is provided with an electrical generator 24 and a pump 34. Actuator 15 is provided with electrical generator 25 and a pump 35. Each of the power packages comprising an electrical generator and a hydraulic pump are driven by a direct coupling to the gear 16a in the transmission 16. Thus, each actuator has a separate electrical power source and a hydraulic power source.

The actuators are controlled by pilot inputs derived from the collective stick 40 and the cyclic stick 41. One channel has been shown extending from each of the collective and cyclic sticks. More particularly, a sensor 42 is utilized as one of five such sensors, four not being shown. Sensor 42 is responsive to commands introduced by way of the collective stick 40 and preferably is an optical sensor to provide, on a fiber-optic channel 43, a collective command to a control module 44, which in response to collective commands actuates all of the actuators 11-15.

In contrast, a sensor 46 is utilized as one of five such sensors (four not being shown) associated with the cyclic stick 41. The sensor 46 feeds signals by way of fiber-optic links 47 to the module 44. The sensors, such as sensor 46, are geometrically arrayed relative to cyclic stick 41 at points corresponding to the positions of the actuators 11-15 so that positionally the swashplate is actuated as indicated by a given movement of cyclic stick 41.

In general, systems for control of the given actuator in response to collective and cyclic pitch commands is well known. While fiber-optics have been indicated as desirable it will be understood that conventional systems heretofore used may be employed in the present invention. It is to be understood that the present invention involves redundancy of actuators to the swashplate 10 and separate supply for each actuator, with the actuator channels thus being independent of one another except for failure logic which may be used to link them and control interplay as between them.

Preferably each input point on the swashplate is controlled by a completely independent channel. Each channel begins at the cyclic and collective sticks where there is a sensor for each channel. The position command signals are transmitted from the sensors to electronics modules 44. The signal is transmitted preferably as a digital signal to electronics modules where it is converted into an electrical analog signal. Each electronics module then controls one actuator which is apart of an integrated actuator package. The actuator is referred to as an integrated actuator package because it is a complete hydraulic system in one package, except for the pump and electrical generator. Each package is powered electrically and hydraulically by a dedicated electrohydraulic power supply. Each power supply is individually driven by the main rotor transmission. The power supply includes the electrical generator which is sandwiched between the hydraulic pump and the transmission drive. Each channel is thus independent from signal generation and transmission to power generation to control output.

FIG. 2

FIG. 2 is a fragmentary partially sectional view of the transmission 16 onto which the actuators, generators and hydraulic pumps are mounted. In this view, actuator 11 is provided with a mounting stem 11g which is secured by pin 11h to a bracket 16b on the lower body portion 16c of transmission 16.

A mounting or cover plate 16f is mounted on top of transmission 16. An opening 16g permits mast 50 to extend through plate 16f. Mast 50 is supported by bearings 49 and is driven by drive means not shown but of conventional construction. The drive gear train from mast 50 includes a drive spline adaptor 51 which supports gear 16a. Gear 16a is rotationally coupled to spline adaptor 51 by way of an overrunning clutch 51a.

Electrical generator 21 and the hydraulic pump 31 and plate 16f are mounted on top of the transmission 16 with a drive shaft 21a being journaled in bearings 16h and 16i mounted in cover plate 16f. Shaft 21a has a pinion on the lower end thereof which pinion is positioned in drive relation to gear 16a. Shaft 31a of pump 31 is splined to the upper end of shaft 21a. Gear 16a, coupled to and rotating with the mast 50 provides drive from mast 50. Whenever mast 50 rotates, electrical power is available from generator 21 and hydraulic power is available from pump 31. Through connections, conventional but not shown, power from generator 21 and hydraulic fluid from pump 31 are applied to an adjacent actuator such as the actuator 11 shown in FIG. 2.

FIG. 3

Figure 3:
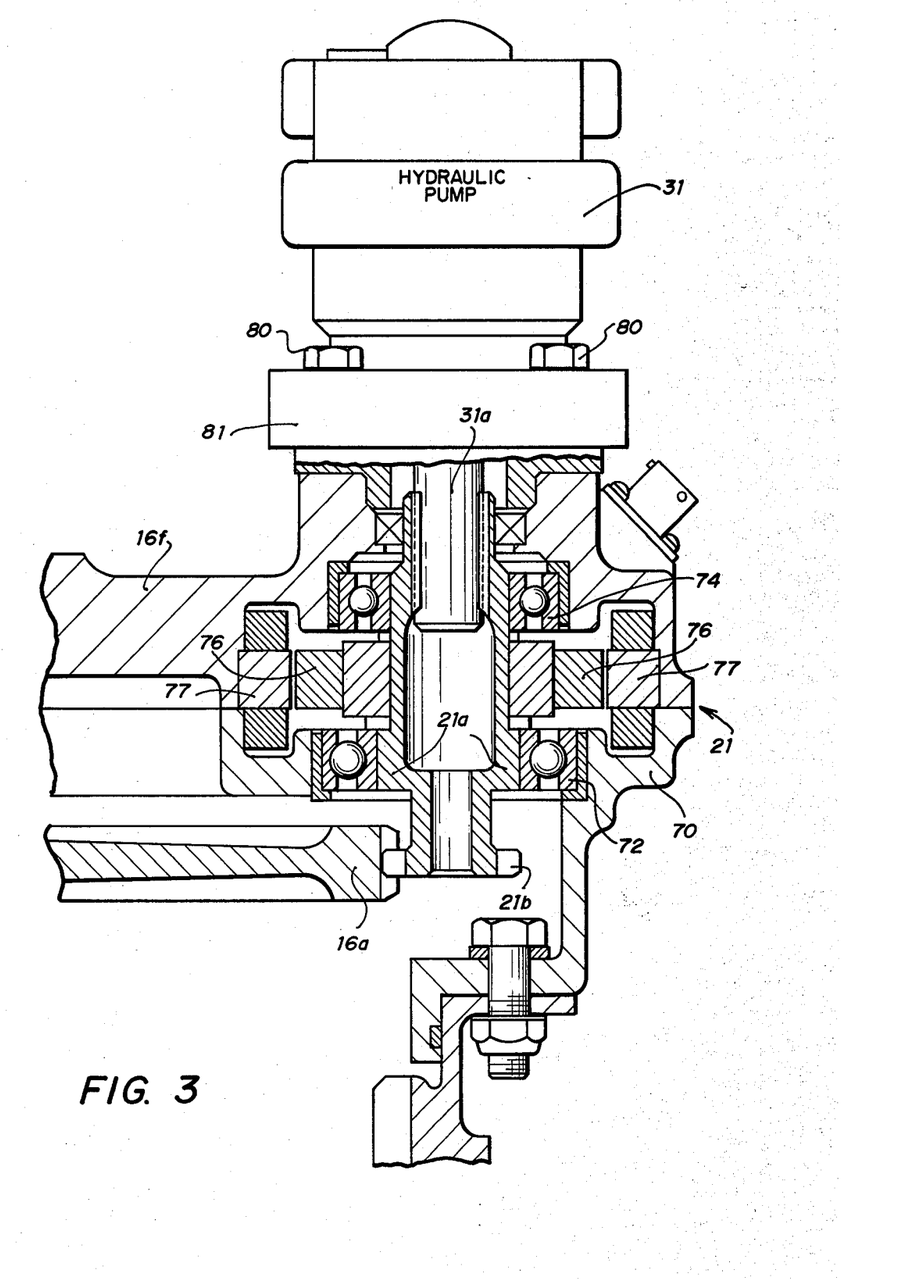
FIG. 3 illustrates an embodiment of an integrated power supply for an actuator.

FIG. 3 shows a preferred embodiment of the integrated pump-electrical generator unit. The generator unit is mounted on mounting pad 70 within and through which there extends a hollow shaft 21a. Shaft 21a is journaled in bearing 72 in pad 70. Plate 16f is formed to receive the generator 21 therein and to be mounted on top of pad 70 and the upper rim of transmission 16. A bearing 74 journals the upper end of the hollow shaft 21a. The lower end of shaft 21a is provided with a pinion 21b which meshes with the teeth on gear 16a which corresponds with gear 16a of FIGS. 1 and 2. Intermediate the length of the shaft 21a are mounted a plurality of samarium-cobalt magnets 76. Alternator windings 77 are mounted on the inner surface of the receptacle formed in plate 16f so that as the shaft 21a carrying magnets 76 rotates, electrical power is generated in the windings 77.

A hydraulic pump 31 is mounted on top of plate 16f by suitable bolts 80 extending through a mounting bracket 81. The shaft 31a of pump 31 is splined to the upper end of the shaft 21a.

It will be apparent that different specific forms of integrated power supplies can be employed in accordance with the present invention. It is to be understood, however, that in any case there will be provided at least four integrated actuator systems, which with its own individual and separate integrated power supply.

One problem associated with connecting multiple actuators to a common load is in appropriately sharing the load between them without engaging in a force fight that may occur due to permissible tolerances in the control loops associated with each of the actuators. A contest among the actuators is undesirable for two reasons. The first reason is that it degrades the servo performance. The second reason is that it will create more severe fatigue environments for the actuators, mechanisms and structural members. In order to minimize contest between the three active and any nonactive on-line channels, an embodiment of the invention involves utilizing only three actuators at any one time with any other on-line actuators being forced output limited by employing a differential pressure feedback on the redundant actuators.

Figure 8:
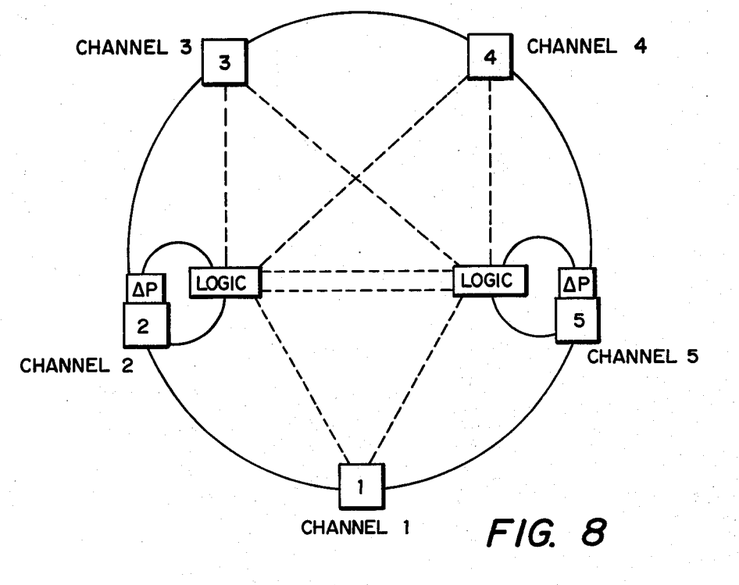
FIGS. 8 and 9 illustrate monitor and shutdown logic electronics.

There are two different types of loads on a helicopter swashplate. First, there is an average or mean load. Superimposed on the mean load are oscillatory loads. The predominant oscillatory load for a two-bladed helicopter has a frequency of two/rev or about 10.8 Hz for a 324 r.p.m. rotor speed. There are also lower amplitude, but higher frequency multiples of the two/rev. By providing redundancy in actuators, the oscillatory loads may be shared by the on-line actuators and the three active actuators. This is accomplished by utilizing a filtered ΔP feedback. This makes the on-line actuators very soft at low frequencies but responsive to share the oscillatory loads at two/rev and higher. Without ΔP feedback, the closed loop spring rate can be made to exceed $10^6$ lbs. per inch. With ΔP feedback on the redundant actuators, they may have an effective spring rate of as low as 2700 lbs./in. If one of the active actuator channels fails, then one of the on-line actuators becomes active by automatically turning off the ΔP feedback to that actuator. Thereafter, if a second active actuator channel fails, then the fifth, remaining, redundant actuator becomes active. The system for providing ΔP feedback and for turning it off is illustrated in FIG. 8.

The system shown in the drawings described above has been called the STAR system because of the five point attachment to the swashplate. It is unique and has the potential of providing the lightest weight and lowest cost of any two fail/operate swashplate control system. Five single piston actuators determine the plane of the swashplate and provide two fail/operate redundancy, even to the extent and two failures of the mechanical hardware as through ballistic impact can be tolerated. The system includes the use of integrated hydraulic actuated packages of the type manufactured and sold by Hydraulic Research-Textron of Valencia, Calif. and identified as Model No. 41003640. It also employs hydraulic pumps of the type which are manufactured and sold by ABEX Corporation, Aerospace Division, Oxnard, Calif., and identified as Model No. 40136. The alternator is of the type manufactured by Electro Kinetics Corporation, Santa Barbara, Calif. and identified as Model No. 5167. Optical stick position sensor and fiber-optic signal transmission links preferably are employed. Each of the five horns on the swashplate are controlled by an independent signal source and driver electronics. Each integrated actuator package channel is isolated from the other four except for failure logic information that is shared between channels. For normal operations, all five integrated actuator packages share the control loads in the swashplate. However, since the system is designed to operate after any two failures, the actuators are sized so that any three actuators can react to the steady and oscillatory control loads. The invention utilizes an active on-line tracking technique to prevent control performance degradation which might result from an accumulation of small differences in gains, thresholds and linearity between the parallel control paths.

In contrast to conventional fly-by-wire approaches the STAR flight control system takes advantage of the fact that three points establish a plane. Since the spacial orientation of the fixed ring of a rotor rise/fall swashplate establishes the pitch, roll, and collective control commands, it is clear that the use of a five-horned swashplate provides for two fail/operate mechanical redundancy. By controlling each horn of the five-horned swashplate by an independent autonomous channel, a two fail/operate capability may be provided. This is the STAR system as depicted in FIG. 1. The stick pick-offs are so arranged that no mixing of signals between channels is required. The system provides the basic control function of the vehicle with no mechanical control rods, bellcranks, or other hardware associated with typical helicopter control systems.

The STAR system utilizes five electronic channels which control the five integrated actuator packages (IAP) 11-15 above described. They are mounted with the body assembly fixed along the perimeter of the upper transmission case. The five small hydraulic pump/electrical generator packages are driven from a drive gear 16a in the transmission top case assembly. Each pump supplies fluid to only one IAP and each generator supplies electrical power to only one electrical channel. In addition to the five drive pads, one additional drive pad is provided for mounting an auxiliary hydraulic motor/pump for use during ground check. This is accomplished by use of a sprag clutch 51a as shown in FIG. 2, the clutch being mounted between the drive gear 16a and mast 50. This permits backdrive of gear 16a relative to the mast 50.

Five individual stick sensors from the cyclic stick and collective stick, respectively, provide signal inputs to the electrical channels which, in turn, control the IAP's 11-15. A single two-stage servo electrohydraulic valve and a single power piston are employed in each IAP. Using actuator displacement, servo valve second-stage spool displacement, and differential pressure information, each channel provides self-monitoring and turn-off/bypass capability with a minimum of interchannel fault monitoring and equalization. Thus, FIG. 1 indicates a single channel of the STAR system.

Each of actuators 11-15 is part of an integrated actuator package which constitutes a completely self-contained hydraulic system except for the variable displacement hydraulic pumps 31-35. Each IAP is designed to operate in a Type II Class 3000 psi hydraulic system. Each IAP consists of an actuator piston and assembly, pressure and return filters, fluid reservoir, various check valves and pressure limiting valves, and an electrohydraulic control module. The control module consists of a two-stage electrohydraulic servo valve (EHSV), an electrically activated solenoid valve which controls a pressure activated bypass valve around the piston, an EHSV second-stage spool valve LVDT position sensor, and a differential pressure transducer.

FIG. 4

Figure 4:
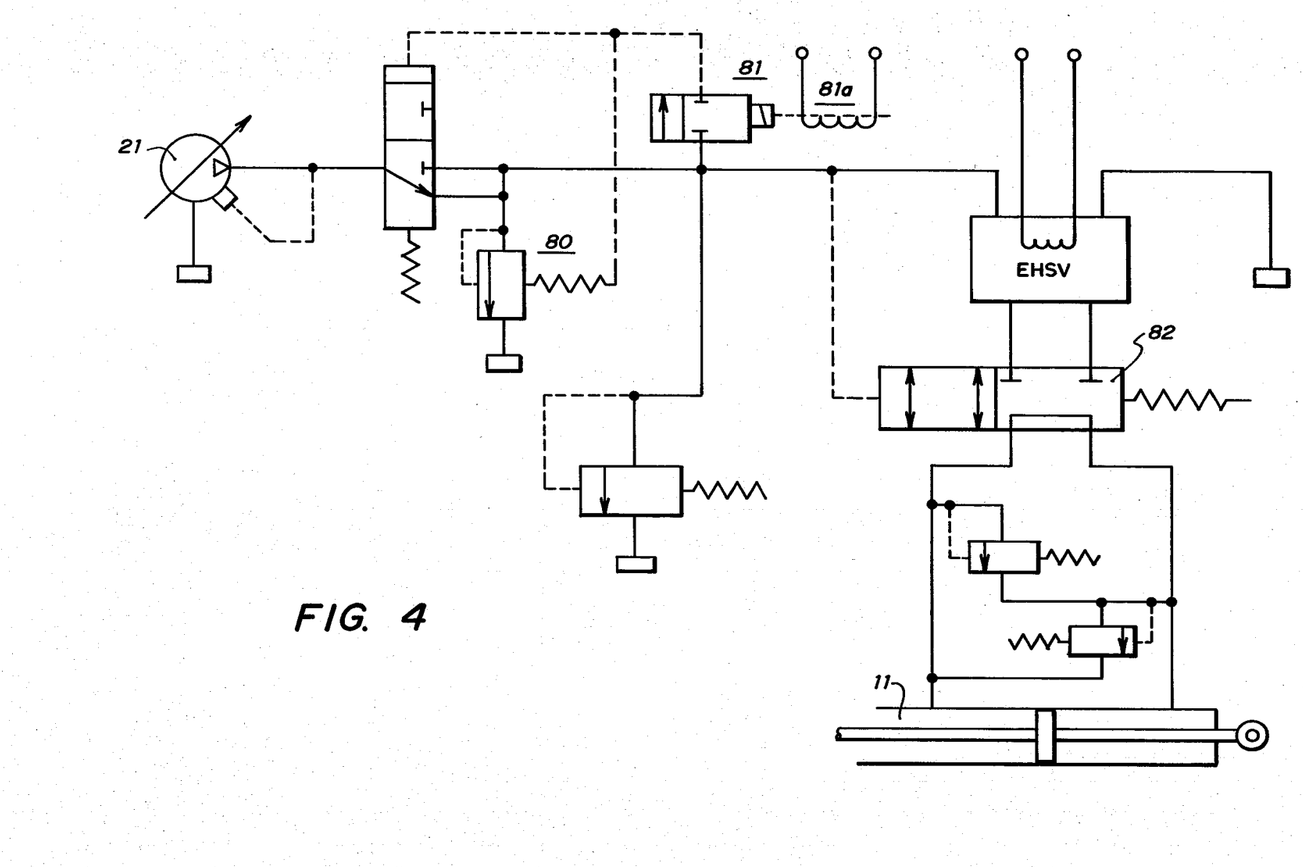
FIG. 4 is a schematic diagram of the hydraulics of each of the IAP's 11-15.

FIG. 4 depicts the hydraulic schematic of the IAP 11. A main pressure limiter valve 80 is enabled by control pressure from the solenoid valve 81. Whenever IAP 11 is disengaged by the removal of voltage from the solenoid coil 81a the piston is switched to the bypass mode, the solenoid control pressure is vented to return, whenever IAP 11 is engaged, the solenoid control pressure is connected to the pressure line and limiter valve 80 is disabled so that full pump regulated pressure is sustained in the pressure circuit.

In the active mode of control, solenoid valve 81 is energized porting supply pressure to the bypass shutoff valve 82 which in turn connects the electrohydraulic control parts to actuator 11. In the bypass mode, the electrohydraulic control parts are blocked by the bypass valve and the actuator control lines are interconnected to return.

The IAP servo response meets or exceeds the following:

| | |
|---|---|
| Rated Current, ma | ±8 |
| Rated velocity @ 3200# load, in/sec | 6.4 ± .64 |
| Output Stroke, in. | ±3.55 |
| Threshold (peak-to-peak), ma max. | 0.08 |
| Stall Force, lbs. min. | 4750 |
| Internal Leakage, gpm. max. | 0.25 |
| Null Bias, ma max. | 0.24 |
| Freq. Response (unloaded) | >35 Hz |
| Engage Time, sec. max. | 0.5 |
| Disengage Time, sec. max. | 0.07 |

FIG. 5

Figure 5:
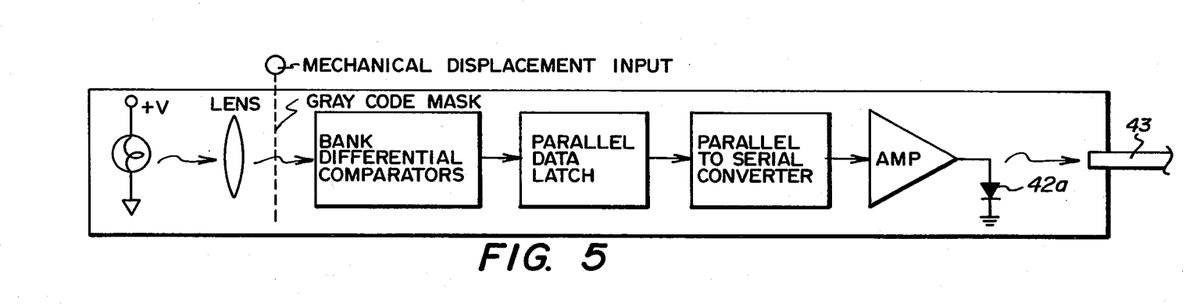
FIG. 5 illustrates an optical sensor.

Electromagnetic interference and lightning induced electromagnetic pulses are potential dangers to any fly-by-wire system. Fiber-optic materials are inherently immune to electromagnetic and electrostatic fields and offer significant advantages over regular metallic conductors for use in signal transmission. Also, position sensors which do not operate on an electromagnetic principle offer inherent advantages. An optical position encoder, FIG. 5, may be used as encoder 42, FIG. 1. Encoder 42 uses a 10-bit optical Gray code mask to encode the pilot's command into a parallel format. After performing parallel-to-serial conversion, a light emitting diode 42a is pulsed to transmit the encoded signal over a fiber-optic cable 43 to the control electronics. An optical decoder in the control electronics converts the command into an analog signal to control the actuator valve driver current.

FIG. 6

Figure 6:
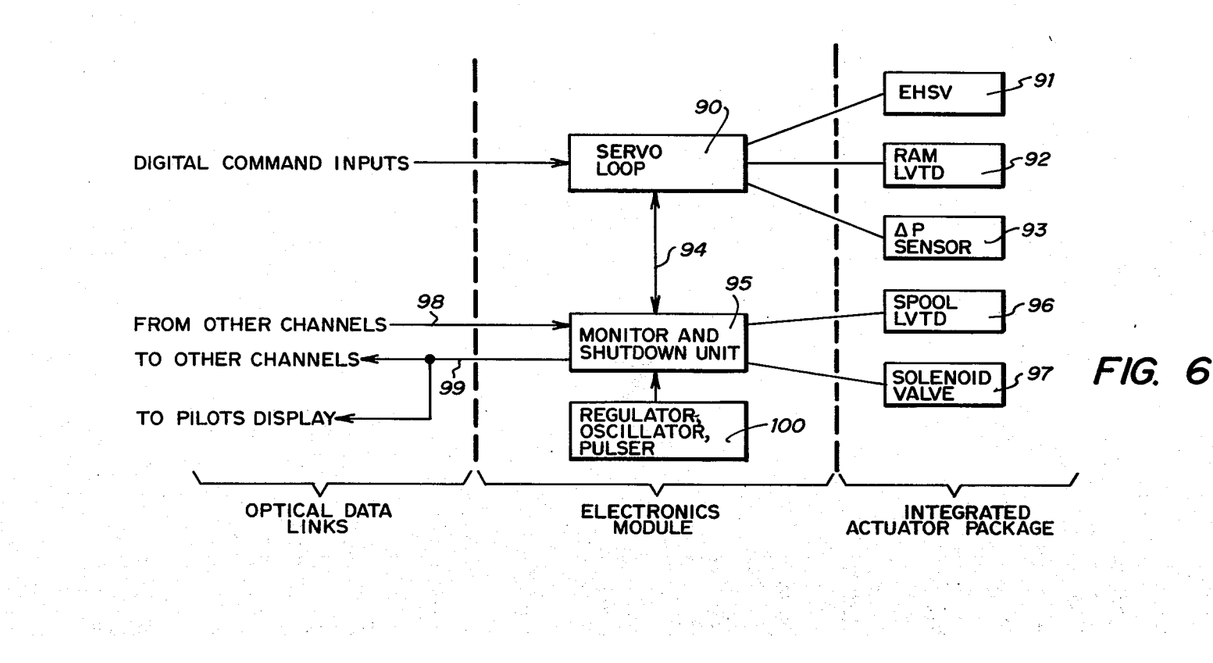
FIG. 6 illustrates an electronic system interface with IAP 11.

An electronic system interface with IAP 11 is shown in FIG. 6. FIG. 6 illustrates the generic functions of the various electronic circuits and the associated elements in IAP II. As above noted, the input/output data to the electronic module is digitally encoded and transferred over fiber-optic data links. Digital command inputs are applied to a servo loop unit 90 having an output going to an electrohydraulic servo valve 91. The main piston position information is provided by way of linear variable differential transformer 92. A pressure sensor 93 also feeds the servo loop 90. The output of the servo loop is connected by way of link 94 to a monitor and shutdown unit 95. A spool linear variable differential transformer 96 is connected to unit 95. Unit 95 also actuates a solenoid valve 97 in the IAP 11.

Other channels are coupled by way of linkage 98 to unit 95. Unit 95 also has a channel 99 leading to the other channels and a pilot display. A regulator, oscillator and pulsor unit 100 is connected to the unit 95.

FIG. 7

Figure 7:
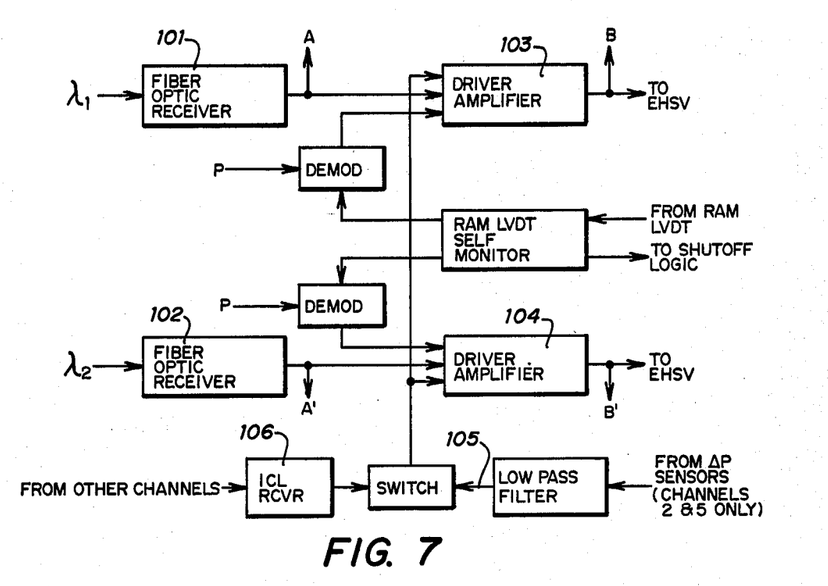
FIG. 7 illustrates servo loop electronics.

Each channel has a servo loop, depicted in FIG. 7. Position command information is decoded by two separate fiber-optic receivers 101 and 102 and is compared with actuator position information in driver amplifiers 103 and 104 to generate an electric command to the IAP 11. Various signal points are monitored to ascertain operate/failure status.

Two of the five channels are implemented with filtered ΔP feedback 105 to eliminate steady-state force fight which typically would result from channel-to-channel mistrack due to an accumulation of small differences in gains, thresholds, and linearity. By using filtered feedback, the actuators 11-15 are not prevented from responding to two/rev load nor rapid control input commands. Interchannel logic (ICL) 106 has signals controlling this feedback path which are transferred via optical links and are shown in FIGS. 8 and 9.

Figure 9:
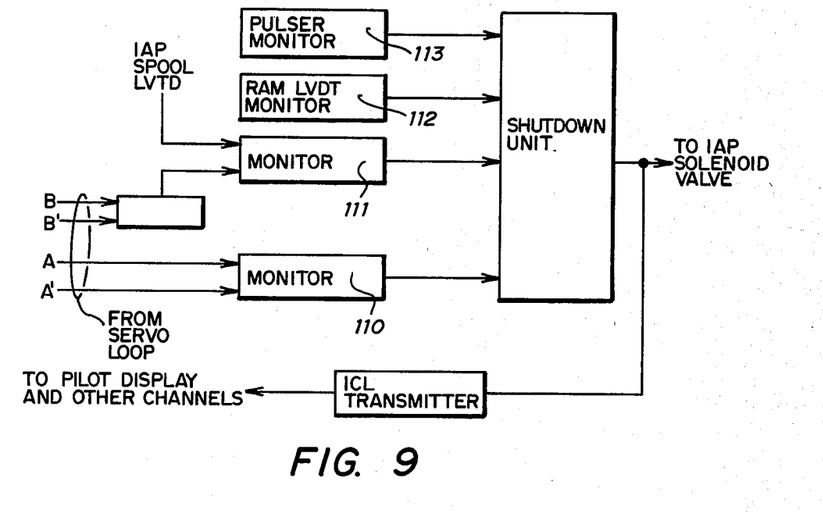

FIGS. 8 and 9

The STAR flight control system provides excellent reliability and survivability to ballistic damage.

Each channel is implemented with self-monitor capability to detect possible channel failure conditions. If a failure is detected, shutdown logic circuitry enables the actuator to be switched into a bypass mode and a status signal to be sent to the cockpit display area and to the other channels as shown in FIG. 9.

The self-monitor capability is provided by the use of four different monitor circuits. The first monitor 110 compares the output from dual fiber-optic receivers to detect stick sensor failure and/or fiber-optic link failure. The second monitor 111 compares the output of a servo valve model with the output from the servo valve second stage spool LVDT to detect hydraulic system failures. The third monitor 112 provides a self-check of the actuator piston position LVDT. The fourth monitor 113 provides a self-check of the pulser circuit which enables the demodulation of the various LVDT sensor outputs.

FIG. 10

Figure 10:
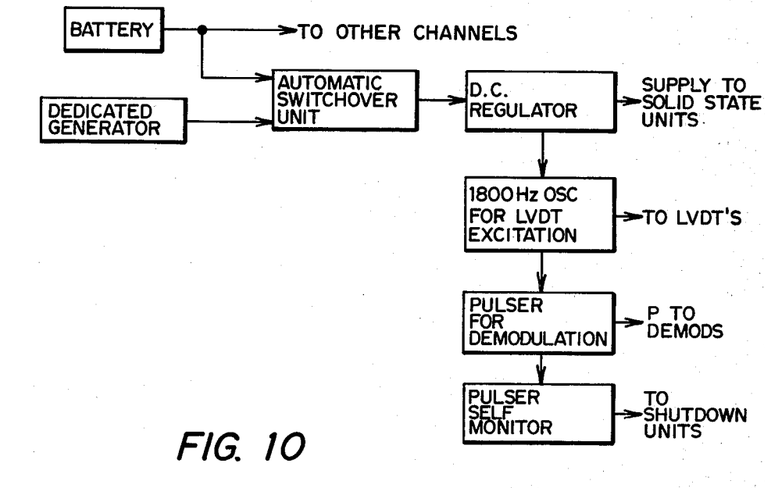
FIG. 10 illustrates electrical supply and regulation units.

Each channel receives electrical power from a dedicated generator once rotor speed exceeds 90 percent of idle speed. Automatic switch-over electronics isolates each channel from the ship's battery used for start-up. Solid state regulation is utilized to derive 15 VDC and 7.5 VDC supply voltages for powdering the various solid state components position sensors. A block diagram of the configuration is shown in FIG. 10.

No mechanical connection exists between the control sticks and the rotor. Thus there is no correlation between stick position and rotor position when the control system is unpowered. Gravitational forces will cause the swashplate and rotor pitch horns to droop into some particular position. Upon start-up, it is important to gain electrohydraulic control as quickly as possible before the rotor has moved very far and/or gained much speed.

Control management during start-up can be described as follows: electrical power is provided to the electronic control modules. Once electrical system checks O.K., engine start-up is initiated. A hardover electrical command to the electrohydraulic servo valve is generated due to the fact that position of actuators does not agree with the position of the stick. As rotor RPM increases, the hydraulic pumps have the capability to supply some pressure and some flow; thus, the actuator begins to respond to the servo valve hardover command. The actuator piston is slaved into a position which agrees with the commanded stick position. At this point the flow requirement is satisfied and pressure builds up rapidly, holding the rotor in flat-track for the remaining time necessary to build up to full RPM.

Test data indicate that within seven seconds the rotor position is synchronized to the control command. By this time, the rotor will have made 1½ revolutions and rotor speed will be 25 RPM.

We claim:

1. In a helicopter having a mast which drives a rotor and which is driven by a transmission and having a swashplate individually linked to pitch horns on each rotor blade, the improvement which comprises:
    (a) at least four control channels coupled to said swashplate, three of which normally control the attitude and position of said swashplate;
    (b) a separate unit to power each said control channel, each power unit being directly driven by said transmission and independent of every other power unit; and
    (c) means to apply control of said swashplate from among said control channels.

2. The combination set forth in claim 1 in which each said power unit comprises an electrical generator and a hydraulic pump coupled to be driven with said mast but spaced apart from every other power unit.

3. The combination set forth in claim 1 in which said transmission includes a clutched gear coupled in driving relation to each said power unit for actuation of said power units when said rotor is driven and in which independent drive means coupled to said gear permits actuation of said power units when said rotor is not driven.

4. The combination set forth in claim 1 in which said transmission has a housing cover through which said mast extends and in which said power units are rested at angularly spaced locations around said mast.

5. In a helicopter control system where rotor blade pitch is controlled by linkages to a swashplate which is tilted to change pitch by inputs at at least three spaced points and which is moved collectively by inputs to said three spaced points, the combination which comprises:
 (a) at least four input control channels each including an actuator and leading to a like number of spaced control points on said swashplate;
 (b) means to power each of said channels and independently of every other channel to respond to pilot controls; and
 (c) means to apply individually powered control forces in said channels to move said swashplate to follow said pilot controls.

6. In combination with a helicopter transmission:
 (a) a swashplate actuator mounted in fixed relation to said transmission;
 (b) a power takeoff from said transmission;
 (c) an electrical alternator powered by said takeoff and coupled exclusively to supply electrical power to said actuator; and
 (d) a hydraulic pump powered by said takeoff and coupled exclusively to supply hydraulic power to said actuator.

7. The method of maintaining control of a pylon mounted swashplate comprising:
 (a) establishing at least four control channel inputs to said swashplate;
 (b) supplying power to each said control channel independent of the power supplied to every other control channel; and
 (c) applying control inputs to said swashplate at at least three of said control channel inputs.

8. The method of claim 7 in which said power is generated at angularly spaced points arranged around said pylon and driven with said pylon.

9. The method of claim 7 in which said power for checking operation of the control system is generated independently of the normal drive of said pylon.

10. The method of powering the controls of a pylon mounted swashplate comprising:
 (a) establishing at least four angularly spaced control channel inputs to said swashplate;
 (b) generating electrical and hydraulic power at each of at least four angularly spaced apart locations relative to said pylon from a mechanical drive leading from said pylon,
 (c) applying said power to each said control channel independent of the power supplied to every other control channel; and
 (d) applying control inputs to said swashplate at at least three of said control channel inputs.

* * * * *